United States Patent [19]

Haas et al.

[11] Patent Number: 4,865,469

[45] Date of Patent: Sep. 12, 1989

[54] CONTACT FREE SEAL FOR A BEARING

[75] Inventors: Roland Haas, Hofheim; Elmar Mause, Schweinfurt; Hans-Joachim Buchelmaier, Königsberg; Manfred Brandenstein, Eussenheim, all of Fed. Rep. of Germany

[73] Assignee: SKF GmbH, Schweinfurt, Fed. Rep. of Germany

[21] Appl. No.: 185,473

[22] Filed: Apr. 22, 1988

[30] Foreign Application Priority Data

Jun. 11, 1987 [DE] Fed. Rep. of Germany ... 8708234[U]

[51] Int. Cl.[4] .............................................. F16C 33/80
[52] U.S. Cl. ..................................... 384/478; 384/480
[58] Field of Search ............... 384/480, 135, 478, 144, 384/151, 153

[56] References Cited

U.S. PATENT DOCUMENTS 2,829,932  4/1958  Werner ............................... 384/135
4,527,915  7/1985  Ikariishi et al. ...................... 384/480
4,743,034  5/1988  Kakabaker et al. .................. 384/480

FOREIGN PATENT DOCUMENTS 8531659  6/1986  Fed. Rep. of Germany .

Primary Examiner—Lenard A. Footland
Attorney, Agent, or Firm—Rosen, Dainow & Jacobs

[57] ABSTRACT

A bearing on a shaft is separated from the bore of a housing by an intermediate sleeve. The sleeve has an annular recess in its end surface, the end surface being spaced from the shaft. A sealing element extends radially in the annular recess and axially between the shaft and the intermediate sleeve. The axially extending arm of the sealing element has a flange extending behind a radially extending surface of the intermediate sleeve to axially hold the sealing element, with play, to the intermediate sleeve. The sealing element is mounted with prestress on the shaft, to rotate therewith during operation.

3 Claims, 1 Drawing Sheet

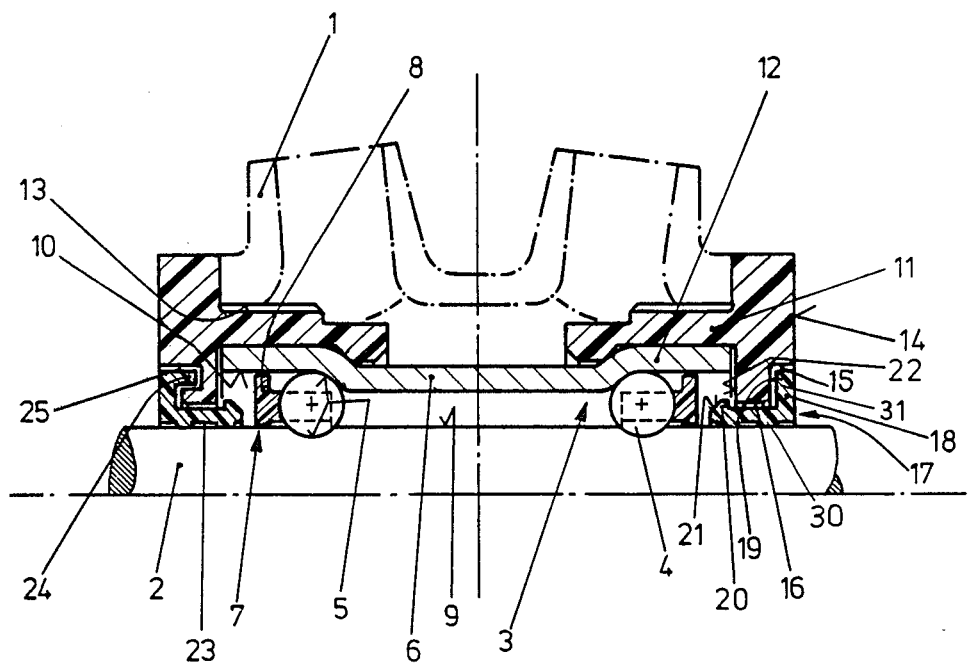

CONTACT FREE SEAL FOR A BEARING

This invention relates to a contact free seal for a bearing, and is especially adapted for use as a bearing installed in an intermediate sleeve of a treadle bearing for the frame of a bicycle or the like.

DE-GM No. 85 31 659 discloses an inclined ball bearing adapted to be fastened in the bore of a housing via an intermediate sleeve. The seal of this known bearing is obtained by a flange on the intermediate sleeve, which extends down to the outer surface of a shaft with play. This seal is not satisfactory for many applications, especially in the presence of spray water.

This invention is therefore directed to the provision of a seal of the above described type which provides a good seal in the presence of spray water and contaminants and in which the friction between the running and stationary components is very low.

This object is achieved in accordance with the invention by the provision of a bearing in which a sealing element is provided in the space between a shaft or the like and the intermediate sleeve, the sealing element having a flange with radial and axial play in an annular recess of the intermediate sleeve or the like. The sealing element is mounted with radial prestress on the shaft or the like.

Due to the provision of the sealing element that rotates with the shaft, a centrifugal disc effect is produced in the region of the flange, which reinforces the sealing action of the labyrinth seal.

In accordance with a further feature of the invention the free end of the axially directed arm of the sealing element has a small outwardly directed flange which extends behind the radially extending inner surface of the intermediate sleeve in the assembled condition of the bearing, so that the sealing element is reliably connected to the intermediate sleeve.

BRIEF DESCRIPTION OF THE DRAWING

In order that the invention may be more clearly understood, it will now be disclosed in greater detail with reference to the accompanying drawing, wherein the single FIGURE of the drawing is a partial cross sectional view, taken in a radial plane, of a bearing arrangement in accordance with the invention, to one side of the axis thereof.

DETAILED DESCRIPTION OF THE INVENTION

The drawing illustrates a treadle bearing arranged in a frame 1 (only partially illustrated) of a bicycle. The treadle bearing is comprised of a shaft 2 and a two row ball bearing 3 whose balls 4 roll on races 5 of the shaft 2 and the outer ring 6. The guiding and holding of the balls are effected by a snap cage 7 having end rings provided with flanges 8 extending radially in its bore and on its radially outer surface. The cage flanges are spaced a small distance from the outer surface 9 of the shaft 2 and the bore surface 10 of the outer ring 6 to seal the inner space of the bearing while providing radial play for the cage. Intermediate sleeves 11, for example of a plastic material, are provided between the frame 1 and the outer ring 6, the sleeves surrounding radially enlarged section 12 of the outer ring 6 and being screwed or pressed in the bore 13 of the frame 1. The intermediate sleeves 11 have T-shaped cross sections and the ends 14 directed away from one another have annular recesses 15. The diameter of the bores 16 of the ends 14 of the intermediate sleeves is larger than the outer diameter of the shaft 2.

The spaces between the shaft 2 and each of the intermediate sleeves 11 are filled with sealing elements 17, the sealing elements being comprised of sleeves, for example of a plastic material, having L-shaped cross sections. The sealing elements 17 have radially outwardly directed flanges 18 with radially extending arms 31 extending into the annular recesses 15 of the intermediate sleeves. The sealing elements 17 are shaped to provide labyrinth gaps between these elements and the intermediate sleeve 11, as a result of which a good bearing seal is provided. In order to axially hold the sealing elements 17 to the intermediate sleeve 11, a small radially outwardly directed flange 20 is provided on the axially inwardly directed free arm 30 of each sealing element. The flanges 20 have inclined surfaces 21 on the sides thereof toward the rolling bodies 4 so that the sealing elements can be shoved into the bore 16 of the intermediate sleeves with elastic deformation of the flanges 20, with the flanges extending with axial play behind the radially extending inner surfaces 22 of the radially inwardly extending arms of the ends 14 of the intermediate sleeves 11. The sealing elements 17 are mounted with radial prestress on the shaft 2 and rotate during operation with the shaft. As a result a centrifugal disc effect is produced by the radially extending flanges 18 of the sealing elements 17, which inhibits the penetration of the bearing by dirt and water. In order that the force necessary to slide the sealing elements on and off of the shaft 2 is not too great, annular recesses 23 are provided in the bores of the sealing elements 17.

The above described arrangement constitutes only one example of the invention. Modifications in the construction of the individual components of the invention are contemplated within the scope of the invention. For example, as illustrated, the labyrinth seal can be improved by providing the free ends of the flanges 18 with axially inwardly bent sections 24 extending into corresponding recesses 25 in the intermediate sleeves 11.

What is claimed is:

1. In a contact free seal for a bearing positioned between a housing and a shaft, the improvement wherein an intermediate sleeve is mounted between the housing and the bearing, the intermediate sleeve having an annular recess and being spaced from the shaft, and a sealing element is provided in the space between the shaft and the intermediate sleeve, the sealing element having a flange arranged with axial and radial play in the annular recess of the intermediate sleeve and being mounted on the shaft with radial prestress, and wherein said sealing element has an axially directed arm with a small radially outwardly directed flange on its free end, which flange has an inclined surface on its free end and wherein said flange extends with axial play behind a radially directed inner surface of the intermediate sleeve.

2. The seal of claim 1 wherein the sealing element has at least one annular recess in its bores.

3. The seal of claim 1 wherein the flange of said sealing element which is arranged with axial and radial play in the annular recess has a radially extending arm, said intermediate sleeve has a second annular recess extending axially thereinto at the radially outer section of said first mentioned annular recess, and an axially inwardly bent section on said radially extending arm of said sealing element extends into the second annular recess of the intermediate sleeve.

* * * * *